United States Patent [19]
Spanier

[11] Patent Number: 4,568,555
[45] Date of Patent: Feb. 4, 1986

[54] CHEESE SAUCE
[75] Inventor: Henry C. Spanier, West Milford, N.J.
[73] Assignee: Nabisco Brands, Inc., Parsippany, N.J.
[21] Appl. No.: 729,631
[22] Filed: May 2, 1985
[51] Int. Cl.$^4$ .............................. A23C 19/09
[52] U.S. Cl. .................. 426/582; 426/589; 426/573; 426/578; 426/658; 426/661
[58] Field of Search .............. 426/582, 589, 573, 578, 426/658, 661

[56] References Cited
U.S. PATENT DOCUMENTS

| | | | |
|---|---|---|---|
| 2,871,127 | 1/1959 | Barch | 426/582 |
| 3,075,842 | 1/1963 | Shaver | 426/582 |
| 3,189,464 | 6/1965 | Heinemann | 426/582 |
| 3,741,774 | 6/1973 | Burkwall | 426/582 |
| 3,836,683 | 9/1974 | Hoos et al. | 426/582 |
| 4,303,691 | 12/1981 | Sand | 426/582 |

Primary Examiner—Jeanette M. Hunter
Attorney, Agent, or Firm—Richard Kornutik

[57] ABSTRACT

Cheese sauce which is shelf stable, has good mouth feel and has superior tolerance to heat. The cheese sauce includes 5 to 15 weight percent of cheese, 0.1 to 0.7 weight percent of lactic acid, 0.2 to 0.6 weight percent of a nontoxic edible alkali metal salt or a nontoxic edible alkaline earth metal salt, 0.05 to 0.5 weight percent of a dairy protein, 0.5 to 5.0 weight percent of natural cheese flavor, 4.0 to 7.0 weight percent of at least one starch, 0.03 to 0.08 weight percent of carrageen gum, 0.2 to 0.4 weight percent of locust bean gum and guar gum, and 70 to 85 weight percent of water. The weight ratio of the carrageen gum, locust bean gum, guar gum and starch to the water is between 0.05 and 0.11. The weight ratio of the carrageen gum, locust bean gum and guar gum to the starch is between 0.03 and 0.12. The weight ratio of the carrageen gum to the locust bean gum and guar gum is between 0.07 and 0.4. The process of preparing the improved cheese sauce is also unique.

27 Claims, No Drawings

CHEESE SAUCE

BACKGROUND OF THE INVENTION

1. Field Of The Invention

The invention relates to cheese sauces, hermetically-sealed containers of such cheese sauces and processes for preparing such cheese sauces.

2. Prior Art

The natural cheese used in cheese sauces is a perishable food item and must be refrigerated. Even with refrigeration, the cheese must be carefully handled in order to prevent unwanted microbial growth, particularly, mold growth. For example, in home use, natural cheese is quite susceptible to mold growth once the cheese package has been opened. Even without opening the package and under proper refrigeration, conventional packaging for home-size packages are susceptible to mold growth. Accordingly, natural cheeses must be obtained shortly before the home use in preparing cheese sauces. This is not only inconvenient for the householder, but has substantially prevented preassembled ingredient packages for preparing cheese sauces with the exceptions where the package is either stored under frozen conditions, which is expensive and most inconvenient, or the package uses a relatively-dry or sterilized cheese composition, which often adversely affects the acceptability of the product.

Efforts to stabilize natural cheeses against spoilage by methods other than freezing have not been met with substantial commercial success. Thus, canning, irradiating, etc., have not produced acceptable results. Also, attempts to stabilize natural cheeses against microbial growth with microbiocides have resulted in deteriorated taste, texture and cooking properties of the cheeses and have not produced satisfactorily commercial results.

Prior art cheese sauces which are shelf-stable do exist, but retorting is used to control the shelf stability and to kill microorganisms. Some of the compositions are retorted in the can—it is actually known as "canning". Such compositions probably contain 25 to 30 percent of cheese, thereby making them somewhat expensive.

U.S. Pat. No. 4,312,891 (Eisfeldt) teaches a fluid "shelf-stable" product with reversible gel structure at refrigerator temperatures used as a filler in a cheese cake. The dessert product contains gelatin, starch, sweetener and a proteinaceous source such as a cheese, casein, or soy protein salt. The product can also contain lactic acid. The gelatin is termed a gel-forming gum. Eisfeldt teaches that gums, such as xanthan gum and locust bean (carob) gum may provide dessert products having properties similar to gelatin-containing products and having some reversible gel character, but do not provide the desirable mouthfeel characteristics of the gelatin containing product, and do not provide a rapid resetting at refrigeration temperatures after being subjected to a high degree of mechanical shear, such as by whipping of air into the product at ambient or refrigeration temperatures. While some locust bean gum can be used with the gelatin, Eisfeldt clearly teaches not to use locust bean gum by itself or in predominace since it does not provide the desired mouthfeel. Eisfeldt uses low levels of water and does not teach the use of whey protein or disodium phosphate.

U.S. Pat. No. 4,031,254 (Kasik et al.) teaches a dry composition which can be instantly reconstituted to a cheese sauce. The dry composition contains base-neutralized casein, fat, an alkali metal or alkaline earth metal salt, oxide or hydroxide (congealant), and artificial or natural cheese flavor. Casein is a phosphoprotein of milk. Disodium phosphate is not specifically mentioned as one of the congealing agents. A stabilizing agent can also be present which is lactic acid, guar gum or carrageen. The dry composition can be reconstituted with water or milk or a milk fraction or derivative containing mostly water.

U.S. Pat. No. 2,313,033 (Joffe) discloses a salad dressing starch paste comprising starch, spices, carob gum, etc., for incorporation into salad dressings, e.g., by addition to a mayonnaise base. Carob gum is the same as locust gum. Psyllium seed gum and soluble organic acids can also be incorporated. The salad dressing is stated to have a smooth texture and Vaseline-like consistency. Joffe does not teach the use of whey protein or disodium phosphate.

U.S. Pat. No. 3,655,405 (Karas et al.) teaches the use of a first package, of a two-package souffle mix, which is a dry sauce mix containing starch, pregelatinized starch, whey solids and flavoring. The dry sauce mix does not disclose the use of gums. Whey solids are mostly carbohydrates with a small percentage of proteins. The second package of dry albumen mix contains a stabilizing agent, which can be gums such as guar gum.

U.S. Pat. No. 2,007,218 (Seltzer) discloses emulsified food products, such as, cream cheese or cottage cheese, which are stabilized with a relatively small quantity of locust bean gum with Karaya gum or Irish moss (seaweed). Locust bean gum is stated to possess certain advantages over other gums such as arabic and acacia gums. When cream cheese is made, the mixture is heated to 165° F., homogenized and then packed hot.

U.S. Pat. No. 2,688,553 (Schicks et al.) teaches a liquid cheese composition which could be used as a sauce. The composition comprises cheese, e.g., cheddar cheese, water, an aliphatic polyhydroxy alcohol, water soluble gum materials and food and/or flavoring materials. Partial high molecular weight fatty acid esters of aliphatic polyhydric alcohols and antioxidants can also be present. The antioxidant can be an alcohol or water extract of finely-ground oat flour. Gum tragacanth is said to have been found more staisfactory in the disclosed composition than other gums, such as Irish moss. As indicated at col. 2, line 26, to col. 3, line 18, the composition is made by first dissolving the gum tragacanth, antioxidant and alcohol in water. Next the cheese is ground and placed in a steam jacketed kettle. Then the gum solution is added to the kettle with stirring, with the mixture subsequently being passed through an electric homogenizer at about 800 pounds pressure. The liquid cheese is sterilized after canning. Preferably Schicks et al. uses a cheese content of 25 to 50 percent whereas the invention cheese sauce has a cheese content of about 8 percent.

U.S. Pat. No. 3,554,764 (Yoder et al.) discloses food products which are thickened by a mixture containing pregelantinized wheat flour and/or starches, an edible gum and sodium stearyl fumarate. Guar gum is the preferred edible gum. The dry mixture is a thickening agent which has reduced heat sensitivity so it can be used as a thickener for canned goods which are to be retorted. See col. 1, lines 69 to 71, and col. 2, lines 3 to 5. Yoder et al. states that the "use of sodium stearyl fumarate is essential." In preparing the dry mixture, Yoder et al. asserts that the gum cannot be added until the starch has been cooked since the cooking deteriorates the gum. Typically Yoder et al. first boils tomato paste and water and then adds the dry mixture followed by more water.

U.S. Pat. No. 3,628,969 (Vilim et al.) teaches starch and milk containing food products which are stable to high-temperature processing, such as, retorting. The products are prepared by admixing hydroxyalkyl starch and carrageenan. It would appear from the language in col. 3 that the product is made by first preparing and homogenizing a fat emulsion system before the system is added to the final formulation. The final products are retorted in sealed cans or jars. Browning or discoloration is avoided according to Vilim et al. The product can be a sauce but cheese is not mentioned. Milk is used as whole milk or dry skim milk powder. Vilim et al. recommends that the entire product be subjected to homogenizer shear before retorting to insure stability of the emulsion. Example III of Vilim et al. teaches that the milk product browns and curds when waxy maize starch and carrageenan are used.

U.S. Pat. No. 3,840,672 (Kasik et al.) teaches cheese-flavored compositions including cheese sauces (see Example 2) which contains acid whey and disodium phosphate. Kasik et al. requires the presence of 10 to 75 weight percent of a cheese flavor of the growth product on protein and carbohydrate of a symbiotic combination of certain microorganisms. A starch is incorporated by Kasik et al. for heat, cold and storage stability properties. Kasik et al. states that alginates and natural gums are included within its definition of starch—see col. 5, lines 33 to 40.

U.S. Pat. No. 4,156,021 (Richardson) discloses simulated food products containing flavoring, coloring and texturizing agents in a food base composition. The base composition includes a mixture of an edible gum, edible oil, water and particulate fibrous cellulose. The latter should have a length of not greater than 40 microns. Among the edible gums disclosed in this patent are locust bean gum, guar gum and carrageenan. Simulated cheese spreads are among the disclosed products of Richardson. See, e.g. Examples II, VI and VII and col. 2, lines 43 to 46—the examples use imitation cheddar cheese. Richardson teaches the use of combinations of hydrocolloid gum, e.g., carrageenan locust bean gum and guar gum, and modified and pregelatinized starches. Richardson includes such starches in the term gums. See col. 16, line 41, to col. 17, line 2. The gums, etc., of Richardson are used as a binding agent for the fibrous cellulose particles.

U.S. Pat. No. 4,160,849 (Huchette et al.) teaches the use of potato pulp as a component in foods such as sauces. A viscosity agent, e.g., a starch derivative, gum arabic, and a "carrageenan", can be added—the potato pulp has a very high starch content. Waxy maize starch is used as the viscosity agents in most of the examples. There is no mention of any cheese products, but tomato-based sauces are taught. The potato pulp is said to be able to withstand processing at high temperature for a lengthy time.

Canadian Pat. No. 722,600 (Carswell) discloses a whipped cheese product which includes a gum stabilizer such as locust bean gum. At least 10 percent by weight of the gum stabilizer must comprise guar gum, although other gums such as locust bean gum can be present.

BROAD DESCRIPTION OF THE INVENTION

An object of the invention is to provide a cheese sauce which is shelf stable without the need for refrigeration, is ready to use, has the mouthfeel of a cheese sauce using the normal amount of real cheese, and has superior tolerance to heat in terms of flavor retention and texture appearance. A further object of the invention is to provide a method for preparing a cheese sauce having the above-described properties. Other objects and advantages of the invention are set out herein or are obvious herefrom to one ordinarily skilled in the art.

The objects and advantages of the invention are achieved by the cheese sauce and methods of the invention.

The invention involves a cheese sauce which is shelf stable, has good mouth feel and has superior tolerance to heat. The cheese sauce includes: (a) about 5 to about 15 weight percent of cheese, e.g., cheddar; (b) about 0.1 to about 0.7 weight percent of lactic acid; (c) about 0.2 to about 0.6 weight percent of water soluble nontoxic edible alkali metal salt or a water soluble nontoxic edible alkaline earth metal salt; (d) about 0.05 to about 0.5 weight percent of a dairy protein; (e) about 0.5 to about 5.0 weight percent of natural cheese flavor; (f) about 4.0 to about 7.0 weight percent of at least one starch; (g) about 0.03 to about 0.08 weight percent of carrageen gum; (h) about 0.2 to about 0.4 weight percent, of locust bean gum and guar gum; and (i) about 70 to about 85 weight percent of water; all of such weight percentages being based on the total weight of the cheese sauce. The weight ratio of the carrageen gum, the locust bean gum, the guar gum and the starch to the water is between about 0.05 about 0.11. The weight ratio of the carrageen gum, the locust bean gum and the guar gum to the starch is between about 0.03 and about 0.12. The weight ratio of the carrageen gum to the locust bean gum and the guar gum is between about 0.07 and about 0.4.

About 8 to about 13 weight percent, based on the total weight of the cheese sauce, of the cheese is preferably used. Preferably the cheese is cheddar cheese. Preferably about 0.4 to about 0.6 weight percent, based on the total weight of the cheese sauce, of the lactic acid is precent. The nontoxic edible alkali metal salt is preferably disodium phosphate, and preferably about 0.3 to about 0.5 weight percent, based on the total weight of the cheese sauce, of disodium phosphate is used. Preferably the dairy protein is whey and preferably about 0.1 to about 0.3 weight percent, based on the total weight of the cheese sauce, of whey protein is used. The starch preferably is a corn starch, and preferably the corn starch is a mixture of corn starches. The corn starch is preferably a pregelatinized waxy maize starch and more preferably a mixture of two pregelatinized waxy maize starches. Preferably about 6.0 weight percent, based on the total weight of the cheese sauce, of the mixture of pregelatinized waxy maize starches is used. Preferably about 0.06 weight percent, based on the total weight of the cheese sauce, of carrageen gum and about 0.3 weight percent, based on the total weight of the cheese sauce, of locust bean gum and guar gum are used. Preferably about 74 weight percent of water is present in the cheese sauce.

The weight ratio of the carrageen gum, the locust bean gum and the guar gum to the starch preferably is about 0.06. Preferably the weight ratio of the carrageen gum to the locust bean gum and the guar gum is about 0.2. The weight ratio of locust bean gum to guar gum preferably is between about 1.5 and about 0.5. Preferably the weight ratio of the carrageen gum, the locust bean gum, the guar gum and the starch to the water is about 0.08 to about 0.09.

Also preferably, the cheese sauce also contains about 3 to about 10 weight percent, based on the total weight of the cheese sauce, of vegetable fat, about 0.5 to about 3.0 weight percent, based on the total weight of the cheese sauce, of at least one seasoning ingredient, and about 0.01 to about 0.04 weight percent, based on the total weight of the cheese sauce, of natural yellow colorant.

The invention, broadly, is a cheese sauce which is shelf-stable and is based on a mixture of starches and gums, with added dairy protein and with a natural cheese flavor, cheese and spices. The invention cheese sauce has a matrix which contains starches and gums in specific ratios. The types of starches and gums and the ratios used are critical in order to achieve a good mouthfeel. The ratio of the starches and gums to the liquid is also critical. A dairy protein is incorporated for proper mouthfeel. The inclusion of disodium phosphate improves the mouthfeel. The second major factor is the flavor which comes from the natural cheese flavors, cheese itself and spices. The objects of the invention cheese sauce formulation are to use a minimal amount of real cheese, that is, approximately 5 to 18 percent, in order to provide a composition which is shelf-stable so that refrigeration is not necessary, to provide a cheese sauce which has the mouthfeel of cheese sauce and to provide a cheese sauce which has superior tolerance to heat in terms of flavor retention and texture appearance. The invention cheese sauce is a nonbrowning product with a smooth creamy consistency and a low solids content. Once the invention cheese sauce composition container is opened or the cheese sauce has been taken from the container, the cheese sauce must be refrigerated if it is not consumed at that time. The invention cheese sauce is a convenience food item which can be stored by the consumer in the home without any special storage conditions.

The invention also involves a hermetically sealed container or package containing the invention cheese sauce.

The invention further involves a process of preparing the invention cheese sauce. The process includes, in a first container, admixing the starch, carrageen gum, locust gum, guar gum and water to form a slurry, heating the slurry to about 170° to about 210° F. and maintaining the slurry at such temperature for a sufficient time to produce a cooked paste. Then, in a second container, the cheese, lactic acid, alkali or alkaline earth metal salt, dairy protein and natural cheese flavor are admixed, the admixture is heated to about 140° to 175° F. and the admixture is homogenized to form a homogenant. The homogenant is blended into the cooked starch to provide a blended mixture. The blended mixture is placed into sealed containers. The blended mixture in the sealed containers are heat sterilized to provide the improved cheese sauce with the desired viscosity.

DETAILED DESCRIPTION OF THE INVENTION

As used herein, all parts, percentages, ratios and proportions are on a weight basis unless otherwise stated herein or otherwise herefrom to one ordinarily skilled in the art.

About 8 to about 11 weight percent, based on the total weight of the cheese sause is used in the invention cheese sauce. This level of cheese is significantly less than prior cheese sauces, which represents a major reduction in cost for the invention cheese sauce. The use of real cheese at the invention level helps provide shelf stability for the invention cheese sauce. Sufficient real cheese should be used to accomplish such a result. Preferably the real cheese is cheddar cheese, but other real cattle or goat cheeses can be used.

The cheese used in the cheese sauce is a perishable item by itself. The invention cheese sauce containing such cheese provides a shelf-stable food item as long as it is kept in a hermetically-sealed container or package. The invention cheese sauce can be stored at ambient temperatures for extended periods of time. Once the package is opened, the invention cheese sauce should be refrigerated if it is not quickly completely used. By "refrigerated" or "refrigeration temperature" is meant the temperature usually encountered in a household refrigerator of from about 2° C. to about 10° C.

At least one dairy protein, preferably whey protein, is included in the invention cheese sauce to give the cheese sauce distinguishing bodying features and to assist in providing the cheese sauce with good or proper mouthfeel. Sufficient dairy protein should be used to achieve such results. About 0.1 to about 0.5 weight percent, based on the total weight of the cheese sauce, of dairy protein is used in the cheese sauce. Preferably about 0.1 to about 0.3 weight percent, most preferably about 0.2 weight percent, based on the total weight of the cheese sauce, of whey protein is used in the cheese sauce. An example of another useful dairy protein, which can be used in the cheese sauce is casein. As used herein, dairy products encompass those obtained from cattle and goats, and dairy protein means that are obtained from such dairy products.

The inclusion of about 0.1 to about 0.6 weight percent, based on the total weight of the cheese sauce, of at least one nontoxic edible alkali metal salt and/or nontoxic edible alkaline earth metal salt in the cheese sauce is an important factor in achieving good or excellent mouthfeel (that is, proper mouthfeel). Sufficient alkali metal and/or alkaline earth metal salt is used to achieve such a result. Preferably the alkali metal salt is disodium phosphate, which is preferably used in an amount of about 0.3 to about 0.5 weight percent, most preferably about 0.5 weight percent, based on the total weight of the cheese sauce. Disodium phosphate is an emulsifier. Examples of other useful water soluble nontoxic edible alkali metal salts and alkaline earth salts are other polyphosphates.

At least one food starch in the amount of about 4.0 to about 7.0 weight percent, preferably 6.0 weight percent, based on the total weight of the cheese sauce, is used in the invention cheese sauce. Preferably the starch is a corn starch, with a mixture of corn starches being even more preferred. Examples of suitable food starches which can be used in the cheese sauce are those of wheat, sorghum, rice, casaba, potato, arrowroot, sago palm and mixtures thereof. Preferably the corn starch is a pregelatinized (modified) waxy maize starch, and more preferably a mixture of pregelatinized (modified) waxy maize starches, preferably two is used. The use of pregelatinized (modified) waxy maize starch is most preferable and critical because it was found to best control the viscosity of the invention cheese sauce. The use of corn starch, especially pregelatinized waxy maize starch, is critical in obtaining the desired mouthfeel in the cheese sauce. Sufficient corn starch, particularly pregelatinized waxy maize starch, is used to provide such result.

The starch used in the cheese sauce of the invention can be any food starch in its native or modified form. Native starches are produced by extraction from: the seeds of plants, such as, corn, wheat, sorghum or rice; the tubers, or roots of plants, like cassaba (tapioca), potato or arrowroot; and the pith of the sago palm. The starch can be either pregelatinized or nongelatinized. If the starch is nongelatinized, the preparation process of the invention must have a heating step which must be sufficient to effect gelatinization during the preparation of the cheese sauce. The use of pregelatinized starch is preferred, and a particularly preferred starch is pregelatinized waxy maize starch.

The invention cheese sauce uses a combination of hydrocolloidal vegetable gums, in certain ranges and ratios, which is critical to achieving good mouthfeel in the cheese sauce. The combination of hydrocolloidal gums is about 0.03 to about 0.08 weight percent, preferably about 0.06 weight percent, based on the total weight of the cheese sauce, of carrageen gum and about 0.2 to about 0.4 weight percent, preferably about 0.3 weight percent, of locust bean gum guar gum. The hydrocolloidal vegetable gums are emulsifiers. The weight ratio of locust bean gum to guar gum is preferably about 1.5 to about 0.5.

The ratio of the hydrocolloidal gums to the starch is critical to obtaining the desired mouthfeel for the invention cheese sauce. The weight ratio of the hydrocolloidal gum to the starch is between about 0.03 and about 0.12, preferably about 0.06. The ratio of the carrageen gum to the locust bean gum and the guar gum is also critical to obtaining the desired mouthfeel for the invention cheese sauce. The weight ratio of the carrageen gum to the locust bean gum and the guar gum is between about 0.07 and about 0.4, preferably about 0.2.

About 70 to about 85 weight percent, preferably about 74 weight percent, based on the total weight of the cheese sauce, of water is used in the cheese sauce. The invention cheese sauce has a fluid consistency similar to a heavy, but flavorable, gravy. The invention cheese sauce has the advantage of not having to be reconstituted in order to use it. Reconstitution is always onerous to a consumer because of the time and mess involved with the chore of reconstituting; besides the consumer may not adequately mix the material to get uniform distribution of ingredients or complete dissolving of ingredients, with resultant uniformity of taste or visual appearance.

The inclusion of about 0.1 to about 0.7 weight percent, based on the total weight of the cheese sauce, of lactic acid in the invention cheese sauce is quite useful. Preferably about 0.5 percent of lactic acid is used. The purpose of the lactic acid is for flavor and pH adjustments.

The cheese sauce can contain about 3 to about 10.0 weight percent, preferably about 5.5 weight percent, based on the total weight of the cheese sauce, of vegetable fat. The vegetable fat is preferably coconut oil, corn oil, cottonseed oil, soybean oil, safflower oil or a partially-hydrogenated vegetable oil. An example of another useful vegetable fats is palm fat or oil. The vegetable fat should have essentially a bland taste and best is liquid at a temperature of less than about 130° F. Mixtures of vegetable fats can be used. Animal fats, such as butterfat, are not used in the invention cheese sauce because they are more prone to rancidity than are vegetable fats.

A natural cheese flavor in the amount of about 0.5 to about 5.0 weight percent, preferably about 0.6 weight percent, based on the total weight of the cheese sauce, is included in the cheese sauce. Sufficient natural cheese flavor is used to provide the desired (final) flavor in the cheese sauce. A synthetic cheese flavor can also be used, but its use is not preferred.

The cheese sauce can contain about 0.2 to about 0.4 weight percent, preferably about 0.3 weight percent, based on the total weight of the cheese sauce, of onion and/or about 0.02 to about 0.04 weight percent, preferably about 0.03 weight percent, based on the total weight of the cheese sauce, of garlic powder. The cheese sauce can also contain about 0.8 weight percent, based on the total weight of the cheese sauce, of salt. The cheese sauce can contain about 0.1 to about 0.5 weight percent, based on the total weight of the cheese sauce, of a supplemental seasoning (spice) mix. Examples of spices useful in the supplemental seasoning mix are pepper, nutmeg, rosemary, dill and ginger. Other flavorants, such as bacon flavors, coffee, cherry, walnut, apple, pineapple, vanilla, chocolate, cocoa, orange, lemon and smoked flavors, can be incorporated in the cheese sauce. Mixtures of flavorants can be used. In total, about 1 to about 5 weight percent, based on the total weight of the cheese sauce, of seasoning mix (which includes the salt, spices, onion powder, garlic powder, etc.). The seasoning mix is an important secondary factor in securing the proper flavor for the invention cheese sauce, or sufficient seasoning mix is used to provide the desired flavor in the cheese sauce.

The flavor of the invention cheese sauce is primarily supplied by the real cheese (e.g., cheddar) and natural cheese flavorant and is secondarily supplied by the seasoning mixture. The flavor is an important factor of the invention cheese sauce. The seasoning mix supplies savor, tang, etc., to the cheese sauce.

The cheese sauce can contain about 0.1 to about 0.4 weight, preferably about 0.03 weight percent, based on the total amount of the cheese sauce, of natural yellow colorant. The specific certified food colorant used can be chosen to provide the exact shade of yellow desired in the cheese sauce. Sufficient natural yellow colorant is used in the cheese sauce to provide the desired yellow color.

Dried or dehydrated fruit and/or vegetable pieces, such as spinach, green pepper, carrot, squash and onion, in the amount of about 0.01 to about 10 weight percent, based on the total weight of the cheese sauce, can be included in the cheese sauce. The fruit or vegetables can be used in minced or puree form.

All of the components of the invention cheese sauce should be water soluble or water compatible. Egg albumen should not be used in the invention cheese sauce.

The cheese sauce of the invention can be prepared by any suitable or conventional method. It is generally desirable to warm (e.g., 90° to 100° F.) the water used in the preparation of the dessert product and to add the other ingredients to the warmed water. The dry ingredients are preferably added by suitable equipment to prevent lumping of the dry ingredients. One suitable method for blending the dry ingredients with the water is a tank containing a continuous piping loop through which the water is recirculated by means of a centrifugal pump. The dry ingredients are gradually fed into the loop prior to passage of the water through the pump. The invention cheese sauce is a homogenous product.

A preferred process for the preparation of the cheese sauce first involves making a starch-gum slurry, which slurry is heated to 170° to 210° F., most preferably 190° F., and held for 5 to 20 minutes, most preferably 10 minutes. In a separate kettle, the cheese, fats, seasonings, spices anf flavorants are mixed with some water, heated to 140° to 175° F., most preferably 160° F., and homogenized. The homogenant is added to (blended in) the cooked starch paste and wetted minced onions or other large vegetable prices and the like are added. The resultant mixture is jarred, capped and retorted. The retorting of the jarred sauce provides the necessary sterilization. The desired viscosity is present after the retorting step. The production process provides a controlled viscosity, hence texture control. The use of the two separate formulations allows separate mixing of each and the shear encountered in the cheese portion allows the use of less shear in the starch-gum slurry. The lower amount of shear means that the viscosity of the starch-gum slurry is not lowered below the desired level. When the gums, starches, cheeses, etc., are mixed in a single vessel, the excess shear needed to provide complete mixing is avoided and causes a lowering of the viscosity below the desired level. In other words, the use of two separate vessels allows viscosity control (via the gums) without the risk of excess shear. The gums are viscosity controllers. The combination of gums and starches allows the sauce to withstand higher heating temperatures, and for a longer time, during the preparation process.

The viscosity measurements herein are made using a Bostwich Consistometer with the readings being taken at 30 seconds. The viscosity of the starch-gum slurry (by itself), having been heated to 185° to 190° F. and held there for 10 minutes, should be in the range of 4.5 to 9 (Bostwich Consistometer) units, preferably about 7.5 units. The viscosity of the blended, combined product (heated at 175° to 185° F.) before retorting should be 8 to 11.5 units, preferably about 9.0 units. The viscosity of the completed cheese sauce product, after retorting and storage for one week in sealed containers and then being reheated to 150° to 160° F. (serving temperature), should be 8 to 12 units, preferably about 10.5 units.

No unusual or specialized equipment is needed to prepare the invention cheese sauce.

The cheese sauce can be packaged in a variety of hermitically-sealed or air-tight containers including glass jars, vinyl chloride tubes, polypropylene cups, aluminum cups, tined cans, and polyethylene/aluminum foil laminate flex packs. The invention cheese sauce in the hermetically-sealed containers are shelf stable for extended periods of time at ambient room temperatures (24° C.) and even longer at refrigeration temperatures (e.g., 7° C.). The mouthfeel, flavor, appearance and texture of the invention cheese sauce are excellent after even long periods of time. Once the invention cheese sauce container is opened, or the cheese sauce is taken from the container, the cheese sauce must be refrigerated if it is not consumed at that time or very shortly thereafter.

Anti-microbial agents can be, but do not have to be, incorporated in the cheese sauce. The cheese sauce does not have to be heat treated (pasteurized) before the container is hermetically-sealed or once in the hermetically-sealed container.

The components of the invention cheese sauce do not separate, precipitate out or coagulate during storage of the invention cheese sauce.

The combination of the gums and starch is important to the cheese sauce because it allows the sauce to withstand higher heating temperatures (and for longer periods of time) than conventional cheese sauces without browning of burning when the sauce is heated, say, in a pan on a stove. The cheese sauce has a substantial tolerance to heating or reheating by the consumer.

The invention cheese sauce is available for use at any time without advance preparation. No other ingredients are needed to complete the invention cheese sauce when one wants to use it. The invention cheese sauce has a soft pleasing mouthfeel, even after refrigeration, without any rubbery texture. A pleasant mouthfeel is obtained even with locust bean (carob) gum and/or guar gum incorporated therein. The invention cheese sauce, for example, can be used in macaroni and cheese dishes or admixed with vegetables.

A preferred embodiment of the improved cheese sauce formulation contains:

| Ingredients | Range, Percent |
| --- | --- |
| Carrageen gum | 0.03 to 0.08 |
| Locust bean gum and guar gum | 0.2 to 0.4 |
| Modified waxy maize-corn starches | 4.0 to 7.0 |
| Whey protein | 0.1 to 0.5 |
| Salt | 0.5 to 1.0 |
| Onion powder | 0.2 to 0.4 |
| Garlic powder | 0.02 to 0.04 |
| Water | 70 to 85 |
| Graded cheddar cheese | 5 to 18 |
| Vegetable fat | 3 to 10 |
| Lactic acid | 0.1 to 0.7 |
| Natural cheese flavor | 0.5 to 5.0 |
| Natural yellow color | 0.01 to 0.04 |
| Disodium phosphate | 0.1 to 0.6 |
| Supplemental seasoning (spice) mix | 0.1 to 0.5 |

EXAMPLE

A particularly preferred cheese sauce was formulated having the following composition:

| Ingredients | Weight Percent |
| --- | --- |
| Carrageen gum | 0.06 |
| Locust bean gum and guar gum | 0.3 |
| Modified waxy maize-corn starches | 6.0 |
| Whey protein | 0.2 |
| Salt | 0.8 |
| Onion powder | 0.3 |
| Garlic powder | 0.03 |
| Water | 74.0 |
| Graded cheddar cheese | 11.8 |
| Vegetable fat | 5.5 |
| Lactic acid | 0.05 |
| Natural cheese flavor | 0.6 |
| Natural yellow color | 0.03 |
| Disodium phosphate | 0.5 |
| Supplemental seasoning (spice) mix | 0.2 |

The cheese sauce was formulated, in a first vessel, admixing the carrageen gum, locust bean gum, guar gum, modified waxy maize-gum starches and water were admixed to form a slurry. The slurry was heated to about 190° F. and held there for about 10 minutes to form a cooked paste. The viscosity of the cooked paste was measured on a Bostwick Consistometer (reading taken at 30 seconds) and was found to be about 7.5 units. In a second vessel, the whey protein, salt, onion powder, garlic powder, vegetable fat, lactic acid, graded cheddar cheese, natural cheese flavor, natural yellow color, disodium phosphate mix and supplemental seasoning mix were admixed. The admixture was heated to about 160° F. and homogenized at that temperature. The homogenant was blended into the heated cooked starch in the first container to produce a blended mixture. The viscosity of the heated blended mixture was measured on the Bostwick Consistometer (reading taken at 30 seconds) and was found to be about 9.0 units. The blended mixture was placed in a number of mason jars, which were then capped (sealed). The filled mason jars were retorted a sufficient amount of time to sterilize the cheese sauce therein. After one week of storage at room temperature, one of the jars was opened and the jar and contents were heated to about 155° F. The viscosity of the heated cheese sauce was measured on the Bostwick Consistometer (reading taken at 30 seconds) and found to be about 10.5 units.

While the invention has been specifically described by reference to various specific embodiments, it will be recognized that various modifications, adaptations and variations, may be made without departing from the spirit and scope of the invention as defined by the following claims.

What is claimed is:

1. Cheese sauce which is shelf stable, has good mouthfeel and has superior tolerance to heat, comprising:
   (a) about 5 to about 15 weight percent, based on the total weight of the cheese sauce, of cheese;
   (b) about 0.1 to about 0.7 weight percent, based on the total weight of the cheese sauce, of lactic acid;
   (c) about 0.2 to about 0.6 weight percent, based on the total weight of the cheese sauce, of a nontoxic edible alkali metal salt or a nontoxic edible alkaline earth metal salt;
   (d) about 0.05 to about 0.5 weight percent, based on the total weight of the cheese sauce, of a dairy protein;
   (e) about 0.5 to about 5.0 weight percent, based on the total weight of the cheese sauce, of natural cheese flavor;
   (f) about 4.0 to about 7.0 weight percent, based on the total weight of the cheese sauce, of at least one starch;
   (g) about 0.03 to about 0.08 weight percent, based on the total weight of the cheese sauce, of carrageen gum;
   (h) about 0.2 to about 0.4 weight percent, based on the total weight of the cheese sauce, of locust bean gum and guar gum; and
   (i) about 70 to about 85 percent, based on the total weight of the cheese sauce, of water, the weight ratio of the carrageen gum, the locust bean gum, the guar gum and the starch to the water being between about 0.05 and about 0.11, the weight ratio of the carrageen gum, the locust bean gum and the guar gum to the starch being between about 0.03 and about 0.12, and the weight ratio of the carrageen gum to the locust bean gum and the guar gum being between about 0.07 and about 0.4.

2. Cheese sauce as claimed in claim 1 wherein about 8 to about 13 weight percent, based on the total weight of the cheese sauce, of the cheese is present.

3. Cheese sauce as claimed in claim 2 wherein the cheese is cheddar cheese.

4. Cheese sauce as claimed in claim 1 wherein about 0.4 to about 0.6 weight percent, based on the total weight of the cheese sauce, of the lactic acid is present.

5. Cheese sauce as claimed in claim 1 wherein the nontoxic edible alkali metal salt is disodium phosphate.

6. Cheese sauce as claimed in claim 5 wherein about 0.3 to about 0.5 weight percent, based on the total weight of the cheese sauce, of disodium phosphate is present.

7. Cheese sauce as claimed in claim 1 wherein the dairy protein is whey protein.

8. Cheese sauce as claimed in claim 7 wherein about 0.1 to about 0.3 weight percent, based on the total weight of the cheese sauce, of whey protein is present.

9. Cheese sauce as claimed in claim 1 wherein the starch is a corn starch.

10. Cheese sauce as claimed in claim 9 wherein the corn starch is a mixture of corn starches.

11. Cheese sauce as claimed in claim 9 wherein the corn starch is a pregelatinized waxy maize starch.

12. Cheese sauce as claimed in claim 11 wherein the pregelatinized waxy maize starch is a mixture of pregelatinized waxy maize starches.

13. Cheese sauce as claimed in claim 11 wherein about 6.0 weight percent, based on the total weight of the cheese sauce, of the mixture of pregelatinized waxy maize starches is present.

14. Cheese sauce as claimed in claim 1 wherein about 0.06 weight percent, based on the total weight of the cheese sauce, of carrageen gum and about 0.3 weight percent, based on the total weight of the cheese sauce, fo locust bean gum and guar gum are present.

15. Cheese sauce as claimed in claim 1 wherein the weight ratio of the carrageen gum, the locust bean gum and the guar gum to the starch being about 0.06.

16. Cheese sauce as claimed in claim 1 wherein the weight ratio of the carrageen gum to the locust bean gum and the guar gum being about 0.2.

17. Cheese sauce as claimed in claim 1 wherein about 74 weight percent of water is present in the cheese sauce.

18. Cheese sauce as claimed in claim 1 wherein the weight ratio of the carrageen gum, the locust bean gum, the guar gum and the starch to the water is about 0.08 to about 0.09.

19. Cheese sauce as claimed in claim 18 wherein the starch is corn starch.

20. Cheese sauce as claimed in claim 19 wherein the corn starch is a mixture of two pregelatinized waxy maize corn starches.

21. Cheese sauce as claimed in claim 1 wherein the weight ratio of locust bean gum to guar gum is between about 1.5 and about 0.5.

22. Cheese sauce as claimed in claim 1 wherein the cheese sauce also contains about 3 to about 10 weight percent, based on the total weight of the cheese sauce, of vegetable fat.

23. Cheese sauce as claimed in claim 1 wherein about 0.5 to about 3.0 weight percent, based on the total weight of the cheese sauce, of at least one seasoning ingredient is present.

24. Cheese sauce as claimed in claim 1 wherein about 0.01 to about 0.04 weight percent, based on the total weight of the cheese sauce, of natural yellow colorant is present.

25. Hermetically sealed container or package containing the cheese sauce of claim 1.

26. Process for preparing a cheese sauce containing:
  (a) about 5 to about 15 weight percent, based on the total weight of the cheese sauce, of cheese;
  (b) about 0.1 to about 0.7 weight percent, based on the total weight of the cheese sauce, of lactic acid;
  (c) about 0.2 to about 0.6 weight percent, based on the total weight of the cheese sauce, of a nontoxic edible alkali metal salt or a nontoxic edible alkaline earth metal salt;
  (d) about 0.05 to about 0.5 weight percent, based on the total weight of the cheese sauce, of a diary protein;
  (e) about 0.5 to about 5.0 weight percent, based on the total weight of the cheese sauce, of natural cheese flavor;
  (f) about 40.0 to about 7.0 weight percent based on the total weight of the cheese sauce, of at least one starch;
  (g) about 0.03 to about 0.08 weight percent, based on the total weight of the cheese sauce, of carrageen gum;
  (h) about 0.2 to about 0.4 weight percent, based on the total weight of the cheese sauce, of locust bean gum and guar gum; and
  (i) about 70 to about 85 weight percent, based on the total weight of the cheese sauce, of water, the weight ratio of the carrageen gum, the locust bean gum, the guar gum and the starch to the water being between about 0.05 and about 0.11, the weight ratio of the carrageen gum, the locust bean gum and the guar gum to the starch being between about 0.03 and about 0.12, and the weight ratio of the carrageen gum to the locust bean gum and the guar gum being between about 0.07 and about 0.4, comprising:
  (I) in a first container:
    (i) admixing said starch, said carrageen gum, said locust gum, said guar gum and said water to form a slurry, and
    (ii) heating said slurry to about 170° to about 210° F. and maintaining said slurry at said temperature for a sufficient time to produce a cooked paste;
  (II) in a second container:
    (i) admixing said cheese, said lactic acid, said alkali or alkaline earth metal salt, said dairy protein and said natural cheese flavor, and
    (ii) heating said admixture to about 140° to 175° F. and homogenizing said admixture to form a homogenant;
  (III) blending said homogenant into said cooked starch to provide a blended mixture; and
  (IV) placing said blended mixture into at least one sealed container and heat sterilizing said blended mixture in said at least one sealed container to provide said improved cheese sauce with the desired viscosity.

27. Process as claimed in claim 26 wherein said heat sterilizing step comprises retorting said sealed containers for a sufficient amount of time to provide said improved cheese sauce with the desired viscosity.

* * * * *